Figure 1:
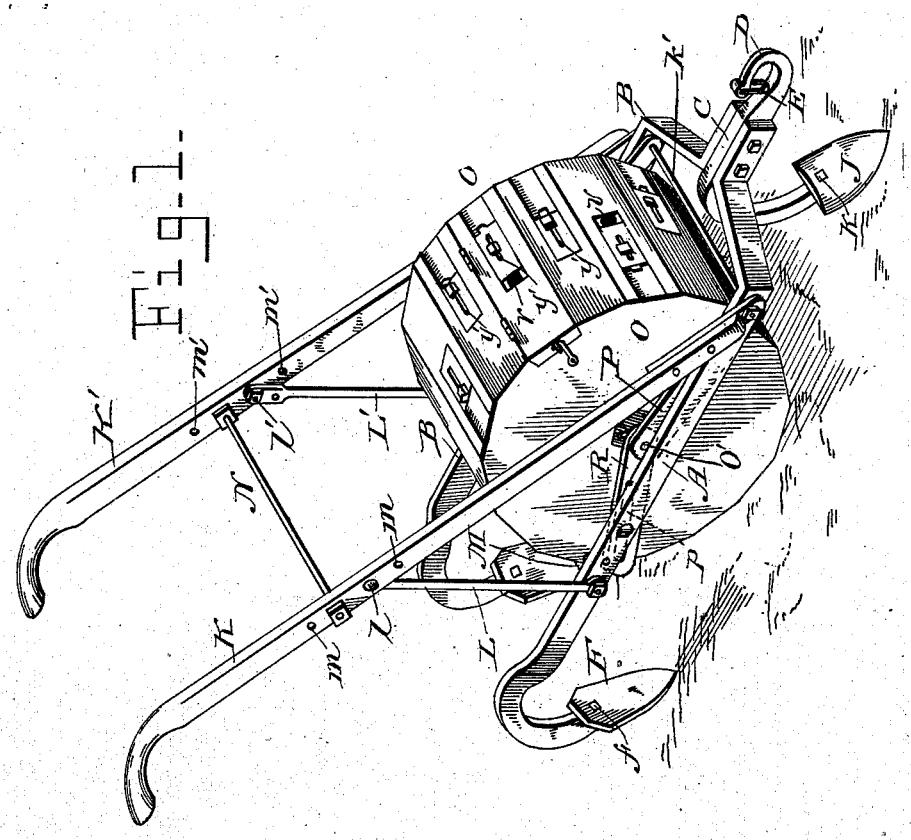

(No Model.)

4 Sheets—Sheet 1.

W. C. PICKLE.
COMBINED SEED PLANTER AND FERTILIZER DISTRIBUTER.

No. 295,939. Patented Apr. 1, 1884.

WITNESSES
Edwin L. Jewell
Chas. J. H. Baker

INVENTOR
Wm. C. Pickle

H. J. Ennis
Attorney (No Model.)  4 Sheets—Sheet 2.
W. C. PICKLE.
COMBINED SEED PLANTER AND FERTILIZER DISTRIBUTER.
No. 295,939.  Patented Apr. 1, 1884.
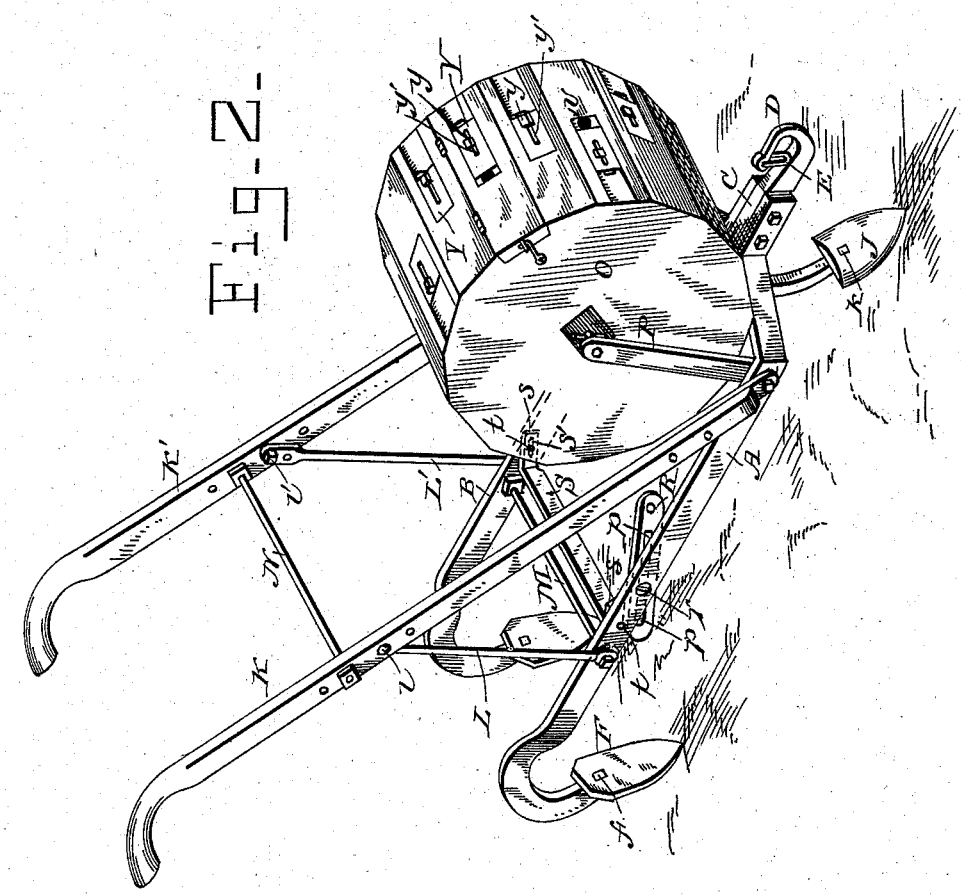
WITNESSES
Chas. T. Baker
Frank Cadmus
Wm. C. Pickle
*INVENTOR*
H. J. Ennis
*Attorney*

(No Model.) 4 Sheets—Sheet 3.
W. C. PICKLE.
COMBINED SEED PLANTER AND FERTILIZER DISTRIBUTER.
No. 295,939. Patented Apr. 1, 1884.
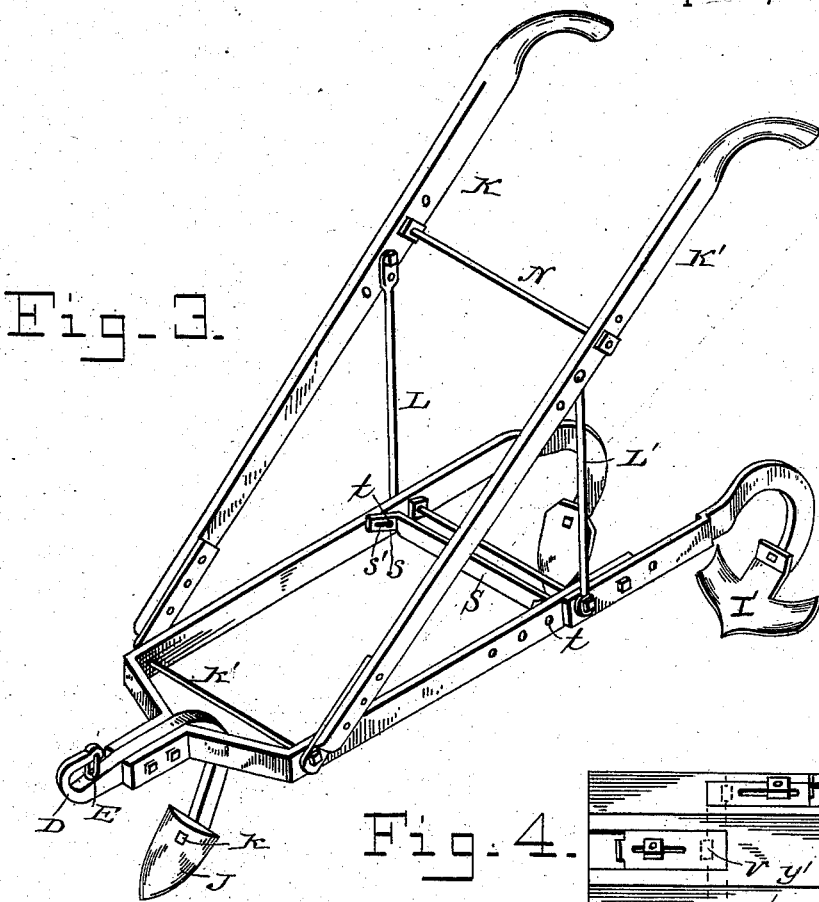
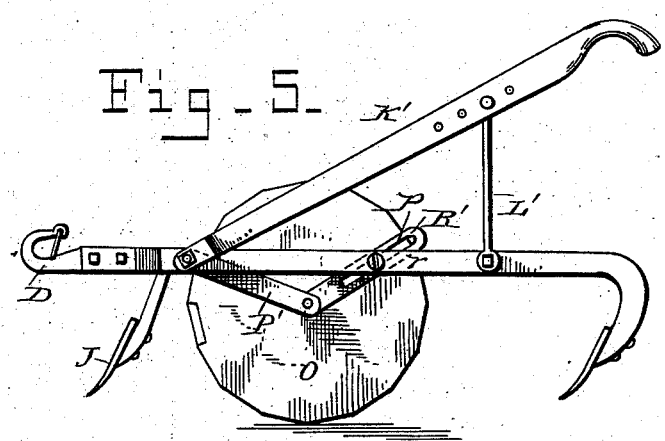
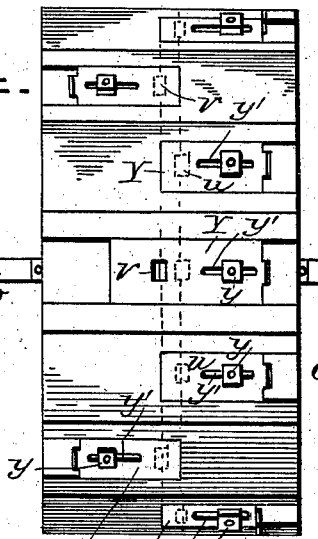
WITNESSES
Edwin L. Yewell
Chas. H Baker
INVENTOR
Wm. C. Pickle
H. J. Ennis
Attorney (No Model.) 4 Sheets—Sheet 4.
W. C. PICKLE.
COMBINED SEED PLANTER AND FERTILIZER DISTRIBUTER.
No. 295,939. Patented Apr. 1, 1884.
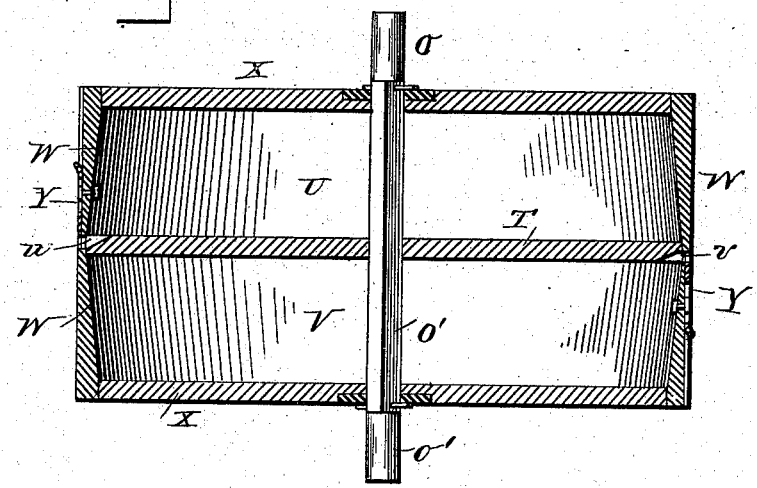
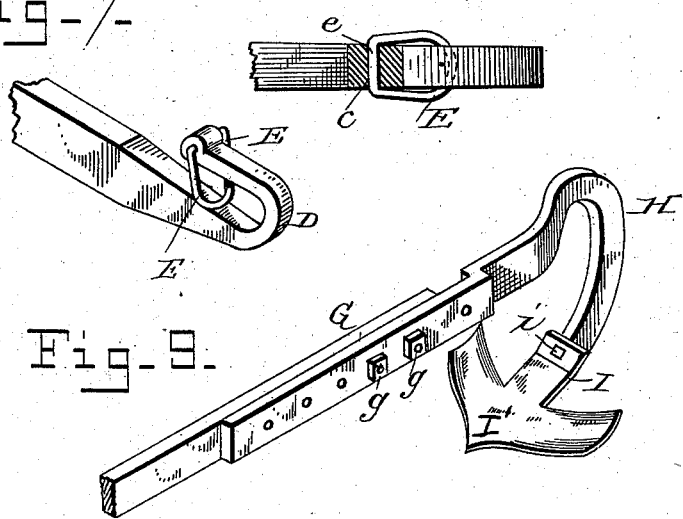
WITNESSES
Edwin L. Yewell.
Chas. H. Baker.
INVENTOR
Wm. C. Pickle
H. J. Ennis
Attorney

UNITED STATES PATENT OFFICE.

WILLIAM CHESLEY PICKLE, OF NECHESVILLE, TEXAS.

COMBINED SEED-PLANTER AND FERTILIZER-DISTRIBUTER.

SPECIFICATION forming part of Letters Patent No. 295,939, dated April 1, 1884.

Application filed January 16, 1884. (No model.)

*To all whom it may concern:*

Be it known that I, WILLIAM CHESLEY PICKLE, a citizen of the United States, residing at Nechesville, in the county of Anderson and State of Texas, have invented certain new and useful Improvements in Combined Seed-Planters and Fertilizer-Distributers, of which the following is a specification, reference being had therein to the accompanying drawings.

My invention has relation to devices for planting seed and grain and fertilizing and cultivating the same; and the object of the invention is to provide a simple and inexpensive implement, as may be constructed on the farm, whereby all kinds of seed and grain may be drilled or planted, the fertilizer distributed before or at the time of planting, and the growing crops cultivated from time to time, as may be necessary; and to these ends the novelty consists in the construction of the same, as will be hereinafter more fully described, and particularly pointed out in the claims.

In the accompanying drawings similar letters of reference indicate the same parts of the invention.

Figure 1 is a perspective elevation of my machine as it appears ready for use as a planter. Fig. 2 is a similar view with the seed-drum elevated. Fig. 3 is a perspective view of the machine with the seed-drum removed to allow its use as a cultivator. Fig. 4 is an elevation of the seed-drum detached from the frame. Fig. 5 is a side elevation of the machine with the seed-drum lowered to serve as a roller for rolling the ground, and also to facilitate its transportation to different parts of the field without allowing the plow-points to come into contact with the soil. Fig. 6 is a section through the seed-drum. Fig. 7 is a perspective, and Fig. 8 a plan view, partly in section, of the draw-bar or clevis. Fig. 9 is a detail perspective, showing extension-bar.

A B are the side pieces of the frame, and at their forward ends are jointly bolted to the draw-bar C, which extends forward and terminates in an upwardly-curved clevis, D. The end of this clevis has a transverse hole, c, through which the straight side e of the link E passes, which link is a little longer than the distance between its hinge e c and the shank of the clevis D, so that while the link E may be raised to allow the insertion of the staple or ring on the single or double tree, and it will fall back by gravity and secure the tree in place, still it cannot be released until the said link E is raised, and by constructing the link E with the straight side e it forms a perfect hinge in the hole c and all lateral motion is avoided, which might allow the tree to become detached. One of the side pieces, A, is curved slightly inward and then downward to form a standard for the plow-blade F, which is detachably secured thereto by the bolt f, while the other side piece, B, extends similarly rearward, and is provided with a sliding extension, G, adjustably secured thereto by the bolts g g. This extension G has a curved standard, H, and secured thereto is the blade I by means of the bolt i. The draw-bar C is bent downward to form a standard, c', for the opening-blade J, secured thereto by the bolt k in the same manner as the rear blades, and of course it will be seen that when the machine is used for planting or fertilizing, the forward blade opens the furrow, and the two rear ones, which slightly converge with reference to each other, close the furrow after the grain, seed, or fertilizer has been placed in it.

K K' are the handles, and are secured at their forward ends to the frame A B by the bolt k'. These handles have two braces, L L', the upper ends of which are secured thereto by bolts l l', passing through an opposite pair of the holes, m m', in said handles, while the lower ends of the braces L L' are secured to the frame A B by the bolt M. It will thus be seen that the height of the handle with respect to the frame may be varied, according to which pair of the holes m m' the upper ends of the braces are bolted to. Thus if in the holes nearest the front, the handles will be raised to their highest extent. If in the rear pair of holes, the handles will be set very low, and at a corresponding height for the intermediate ones.

N is a brace-rod to brace the handles laterally, and it may be used to dispense with the bolts l l', if desired.

O is the seed-drum, and is mounted upon a shaft, O', having journals o o', upon which it revolves in the rear ends of the arms P P', the forward ends of which are hinged to the bolt k', so as to allow a free play to the drum up and down. R R' are a pair of similar arms, their forward ends having bearings for the shaft O', and they are provided each with a slot, p, by means of which they are adjustably secured to the side of the frame by bolts r. When the machine is used as a planter, the bolts r are slackened, so the drum will have a free vertical play, and thus conform to the undulations of the ground. When the machine is to be used as a cultivator, the drum is elevated, so as to be above the points of the plows, and is locked in this position by the bolts r, and in this condition is used for cultivating without the drum touching the ground. If, however, it is to be used as a roller, or is to be transported from one place to another, the drum is lowered below the points of the plows, as shown in Fig. 5, which clearly explains this feature, of course it being understood that the drum is retained in this position by screwing up the bolts r, which clamp the arms R R' to the frame and hold it secure.

S is a scraper having angular ends s s, provided with slots s' s', through which pass bolts t, securing it to the sides A B. By means of these slots s' s' the scraper may be adjusted so as to remove the adhering earth from the drum while in operation, and which in sticky or waxy ground might possibly interfere with the perfect working of the machine.

The seed-drum O has a central partition, T, dividing it into two distinct compartments, U and V, each being provided with discharge-openings u v, arranged around the periphery of the drum in a central line. The interior walls, w, of the drum slope from the sides x to the center, so that as it revolves the seed or grain will have a tendency to gravitate toward the outlets, and the supply of seed through these openings is regulated by a series of slides, Y, secured on the outside of the drum by bolts y, passing through the slots y' in said slides.

The openings u all lead from the compartment U, and the openings v from the compartment V, and are arranged with their respective slides so that one opening v is placed between each of a series of three of the openings u. This novel arrangement of the seed-drum allows a very wide range in planting the various kinds of seed as well as the distribution of the fertilizer.

In working cotton—that is, in cultivating the growing plants—one of the shovel-blades, I, is removed and a double-winged scraper, I', is substituted, and the extension G is adjusted a short distance back of the blade F, as shown in Fig. 3.

Various other combinations, modifications, and arrangements will readily suggest themselves to the operator as occasion requires the changes.

Having thus fully described my invention, what I claim as new and useful, and desire to secure by Letters Patent of the United States, is—

1. In a seed-planter, the combination, with the frame and shovel-points and seed-drum, of the hinged arms P P', and the arms R R', provided with slots p, whereby said frame and shovels may be raised or lowered, as and for the purposes set forth.

2. The combination, with the frame and the seed-drum, of the arms P P', hinged to the rod k', and the arms R R', having slots p, whereby said drum may be allowed a free vertical motion or be rigidly set at a given height, substantially as shown and described.

In testimony whereof I affix my signature in presence of two witnesses.

WILLIAM CHESLEY PICKLE.

Witnesses:
JNO. T. BRYAN,
T. J. POSEY.